United States Patent
Poo et al.

(10) Patent No.: US 10,841,107 B2
(45) Date of Patent: Nov. 17, 2020

(54) EFFICIENT DELAY-BASED PUF IMPLEMENTATION USING OPTIMAL RACING STRATEGY

(71) Applicant: Analog Devices, Inc., Norwood, MA (US)

(72) Inventors: Tze Lei Poo, Cambridge, MA (US); Sadaf Ahmad, Medford, MA (US)

(73) Assignee: Analog Devices, Inc., Norwood, MA (US)

( * ) Notice: Subject to any disclaimer, the term of this patent is extended or adjusted under 35 U.S.C. 154(b) by 223 days.

(21) Appl. No.: 15/818,530

(22) Filed: Nov. 20, 2017

(65) Prior Publication Data
US 2019/0158299 A1    May 23, 2019

(51) Int. Cl.
*H04L 9/32*     (2006.01)
*H04L 9/08*     (2006.01)
*H04L 9/34*     (2006.01)

(52) U.S. Cl.
CPC ............ *H04L 9/3278* (2013.01); *H04L 9/088* (2013.01); *H04L 9/0861* (2013.01); *H04L 9/0866* (2013.01); *H04L 9/34* (2013.01)

(58) Field of Classification Search
CPC ..... H04L 9/3278; H04L 9/0866; H04L 9/088; H04L 9/34; H04L 9/0861
See application file for complete search history.

(56) References Cited

U.S. PATENT DOCUMENTS

| 9,208,355 | B1 | 12/2015 | Areno |
| 9,584,329 | B1 | 2/2017 | Trimberger |
| 9,762,241 | B1 | 9/2017 | Intel |

(Continued)

FOREIGN PATENT DOCUMENTS

| CN | 103236922 A | 8/2013 |
| CN | 103778374 A | 5/2014 |

(Continued)

OTHER PUBLICATIONS

Dodis et al., Fuzzy extractors: How to generate strong keys from biometrics and other noisy data. SIAM journal on computing. 2008; 38.1: 97-139.

(Continued)

*Primary Examiner* — Mohammed Waliullah
(74) *Attorney, Agent, or Firm* — Wolf, Greenfield & Sacks, P.C.

(57) ABSTRACT

According to various aspects, a delay-based physical unclonable function (PUF) device is provided. According to one embodiment, the PUF device includes circuitry for generating output bits of entropy by comparing, or "racing", a plurality of PUF cells. A PUF cell is a building block of the PUF device. For example, the PUF device may include two identically designed circuits with only process related variations and each circuit can be a PUF cell. According to another aspect, if PUF cells with same history of winning or losing are being compared in a race, adversaries cannot predict the outcome of the current race based on previous race results. Accordingly, systems and methods are described herein for generating multiple rounds of races based on the previous rounds of races. Thus, one PUF cell can be used in multiple pairwise comparisons while maximal entropy is extracted.

20 Claims, 9 Drawing Sheets

(56) References Cited

U.S. PATENT DOCUMENTS

| | | |
|---|---|---|
| 2006/0221686 A1 | 10/2006 | Devadas et al. |
| 2007/0250938 A1 | 10/2007 | Suh et al. |
| 2012/0183135 A1* | 7/2012 | Paral ................ H04L 9/0866 380/44 |
| 2013/0019324 A1 | 1/2013 | Tehranipoor et al. |
| 2013/0276151 A1 | 10/2013 | Lewis et al. |
| 2014/0091832 A1* | 4/2014 | Gotze ................ H03K 19/003 326/8 |
| 2014/0225639 A1 | 8/2014 | Guo et al. |
| 2016/0006570 A1 | 1/2016 | Falk et al. |
| 2016/0227348 A1 | 8/2016 | Guo et al. |
| 2018/0176025 A1* | 6/2018 | Suresh ................ H04L 9/3278 |
| 2019/0068190 A1* | 2/2019 | Karpinskyy ........ H04L 9/0869 |

FOREIGN PATENT DOCUMENTS

| | | |
|---|---|---|
| CN | 104200180 A | 12/2014 |
| CN | 105027136 A | 11/2015 |
| CN | 106372539 A | 2/2017 |
| JP | 2012-216405 A | 11/2012 |
| JP | 2013-534062 A | 8/2013 |
| KR | 2015-0026737 A | 3/2015 |
| KR | 2016-0039011 A | 4/2016 |

OTHER PUBLICATIONS

Maes et al., Physically unclonable functions: A study on the state of the art and future research directions. Towards Hardware-Intrinsic Security. Springer Berlin Heidelberg. 2010; 3-37.

Maiti et al., Improved ring oscillator PUF: an FPGA-friendly secure primitive. Journal of Cryptology. 2011; 24.2: 375-397.

Rührmair et al., Modeling Attacks on Physical Unclonable Functions. Proceedings of the 17$^{th}$ ACM Conference on Computer and Communications Security. 2010; 237-249.

Suh et al. Physical Unclonable Functions for Device Authentication and Secret Key Generation. Proceedings of the 44$^{th}$ Annual Design Automation Conference. ACM. 2007; 9-14.

* cited by examiner

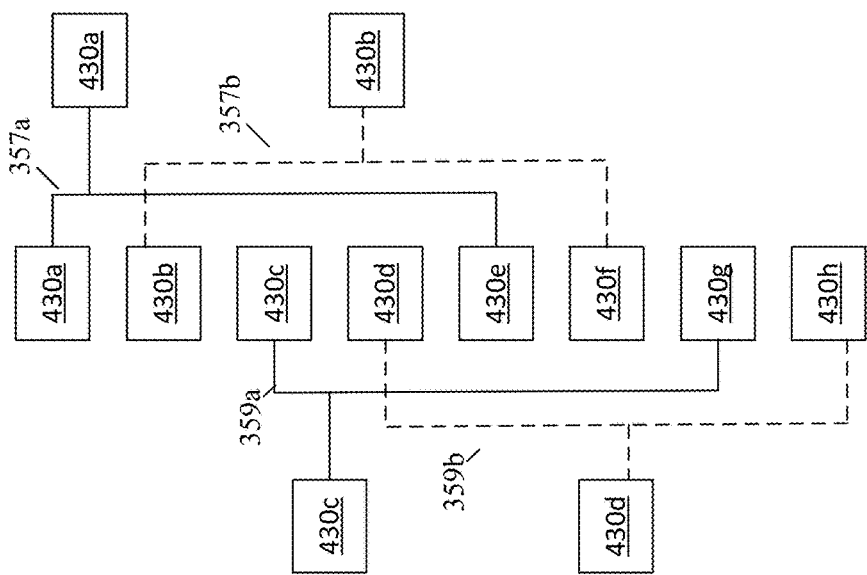
FIG. 4C
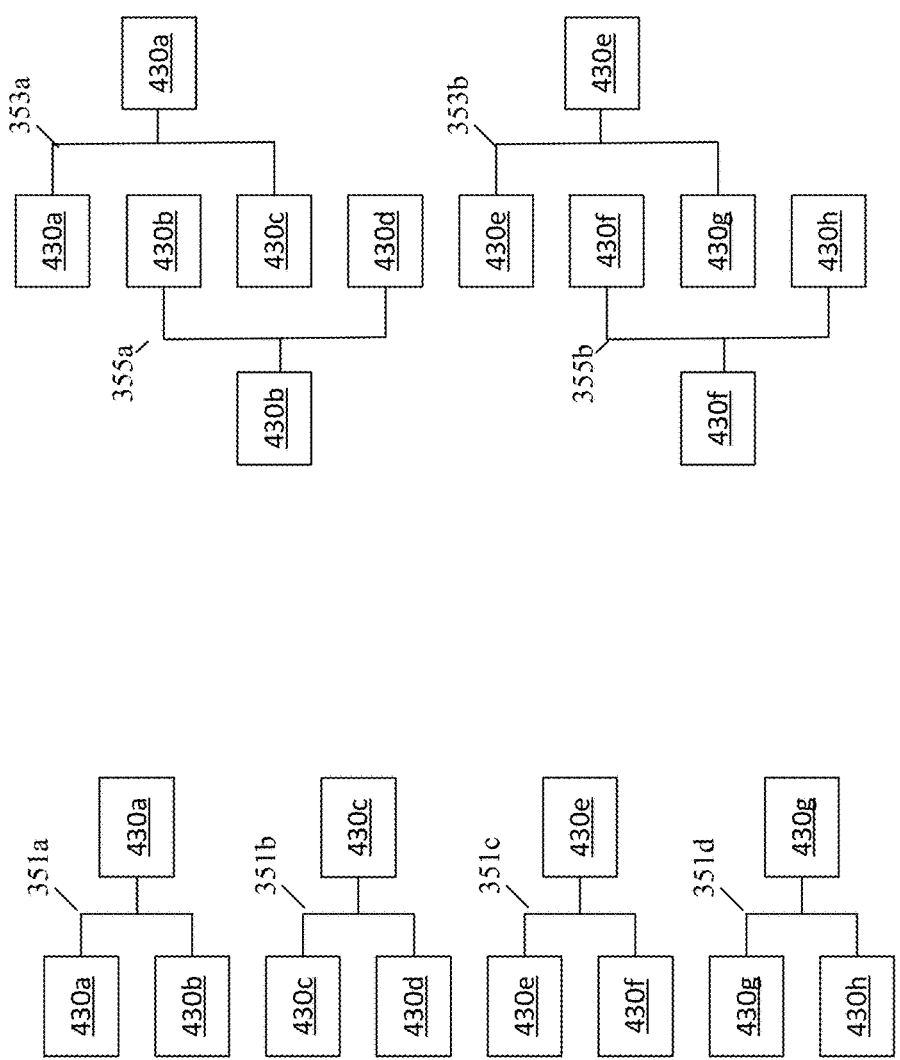
FIG. 4B
FIG. 4A

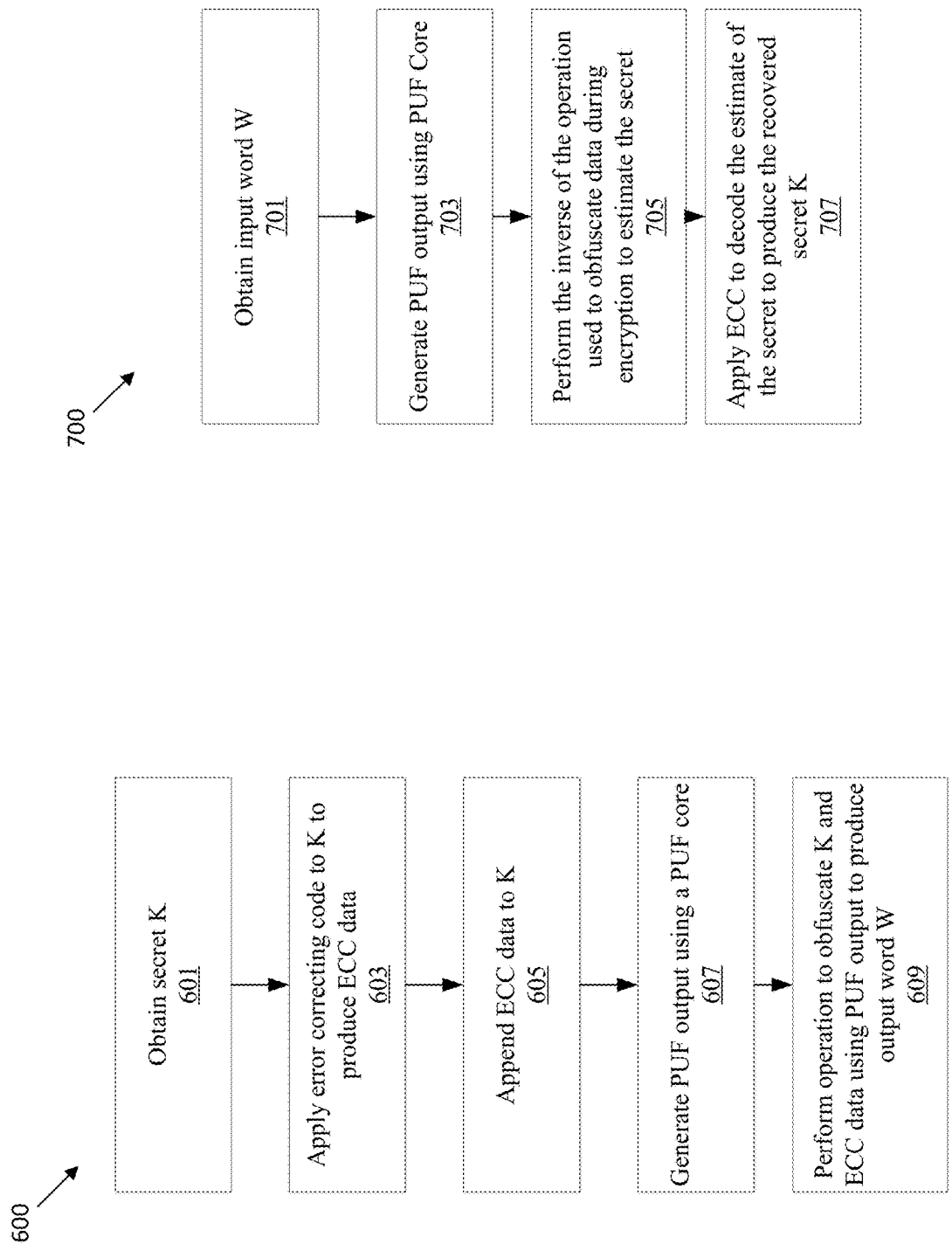

US 10,841,107 B2

EFFICIENT DELAY-BASED PUF IMPLEMENTATION USING OPTIMAL RACING STRATEGY

FIELD OF THE DISCLOSURE

The present disclosure relates to physical unclonable function ("PUF") encoding systems and methods.

BACKGROUND

A PUF can comprises a device or circuitry that generates an output dependent on unique physical properties of the device. For example, variations in manufacturing process and parts produce a chip comprising electrical circuits with unique hardware characteristics as even the smallest variation (e.g., process dependent variations in delays) provides uniqueness.

SUMMARY OF THE DISCLOSURE

According to various aspects, a delay-based physical unclonable function (PUF) device is provided. According to one embodiment, the PUF device includes circuitry for generating output bits of entropy by comparing, or "racing", a plurality of PUF cells. For example, the races can be executed by comparing the frequencies of two identically designed ring oscillators (RO) or two paths of an arbiter. A PUF cell is a building block of the PUF device. For example, the PUF device may include two identically designed circuits with only process related variations and each circuit can be a PUF cell. In one example, a PUF cell may be an RO in an RO PUF, a delay path in an arbiter PUF, other components of other delay based PUFs, or any circuitry for generating the output of a suitable PUF. According to another aspect, if PUF cells with same history of winning or losing are being compared in a race, adversaries cannot predict the outcome of the current race based on previous race results. Accordingly, systems and methods are described herein for generating multiple rounds of races based on the previous rounds of races. In some embodiments, in each round, the winners of the previous round are raced against each other, while losers are raced against losers. Thus, one PUF cell can be used in multiple pairwise comparisons while maximal entropy is extracted. Various embodiments preserve full entropy for encoding values while reducing the required number of PUF cells when compared to conventional approaches.

According to one aspect of the present application, a method for generating entropy in a physical unclonable function (PUF) is provided. The method comprises assigning by at least one processor, in a first round, first pairings of respective ones of a plurality of PUF cells; generating, in the first round, respective first outputs from each of the plurality of PUF cells and determining results for the first round including a winner for each pair of PUF cells in the first pairings; assigning, in a second round subsequent to the first round, second pairings of respective ones of the plurality of PUF cells based on the results of the first round; generating, in the second round, respective second outputs from each of the plurality of PUF cells and determining results for the second round including a winner for each pair of PUF cells in the second pairings; and generating a PUF output based on the results of the first round and the results of the second round.

According to one embodiment, the method further comprises obfuscating a secret using the PUF output. According to one embodiment, each PUF cell, of the plurality of PUF cells, comprises one of a plurality of identically designed circuits with differences stemming from manufacturing process variations. According to one embodiment, the method further comprises generating a bit representing the winner of each pair of PUF cells in each round, wherein a winner of a pair of PUF cells is associated with an output of a binary comparison of respective outputs of each PUF cell in the pair, and further wherein the pairings of the first round and the second round generate a number of bits of entropy equal to the number of PUF cells. According to one embodiment, the method further comprises applying, by the at least one processor, an error correcting code to the respective first outputs from each of the plurality of PUF cells prior to the second round.

According to one embodiment, assigning, in a second round subsequent to the first round, second pairings of respective ones of the plurality of PUF cells based on the results of the first round comprises: assigning pairings of the respective winners of each pair of PUF cells in the first pairing; and assigning pairings of the remaining PUF cells that were not winners in the first pairing. According to one embodiment, the method further comprises assigning, in a third round subsequent to the second round, third pairings of respective ones of the plurality of PUF cells based on the results of the first round and the second round, wherein each PUF cell of the plurality of PUF cells is paired with a PUF cell of the plurality of PUF cells having been the winner of an equal number of rounds (or pairings); and generating, in the third round, respective third outputs from each of the plurality of PUF cells and determining a winner for each pair of PUF cells in the third pairings. According to one embodiment, a first winner of a first pair in a previous round is paired with a second winner of a second pair in the previous round. According to one embodiment, the method further comprises assigning additional rounds of pairings based on the results of previous rounds, wherein the total number of rounds is limited by the at least one processor to not exceed the binary logarithm of the number of PUF cells in the plurality of PUF cells.

According to one embodiment, the method further comprises assigning additional rounds of PUF cell pairings based on the results of previous rounds by: grouping, into a plurality of groups, PUF cells that have been paired in a previous round; and pairing each PUF cell in a first group with a respective PUF cell in a second group.

According to one aspect of the present application, a system for generating entropy in a physical unclonable function (PUF) is provided. The system comprises a plurality of PUF cells; and at least one processor configured to: assign, in a first round, first pairings of respective ones of a plurality of PUF cells; generate, in the first round, respective first outputs from each of the plurality of PUF cells and determine results for the first round including a winner for each pair of PUF cells in the first pairings; assign, in a second round subsequent to the first round, second pairings of respective ones of the plurality of PUF cells based on the results of the first round; generate, in the second round, respective second outputs from each of the plurality of PUF cells and determine results for the second round including a winner for each pair of PUF cells in the second pairings; and generate a PUF output based on the results of the first round and the results of the second round.

According to one embodiment, the at least one processor is further configured to obfuscate a secret using the PUF output. According to one embodiment, each PUF cell, of the plurality of PUF cells, comprises one of a plurality of identically designed circuits with differences stemming from manufacturing process variations. According to one embodiment, the system further comprises a binary comparator, wherein the at least one processor is further configured to generate a bit representing the winner of each pair of PUF cells in each round, wherein a winner of a pair of PUF cells is associated with an output of the binary comparator having compared respective outputs of each PUF cell in the pair, and further wherein the pairings of the first round and the second round generate a number of bits of entropy equal to the number of PUF cells. According to one embodiment, a first winner of a first pair in a previous round is paired with a second winner of a second pair in the previous round, and further wherein the at least one processor is further configured to apply an error correcting code to respective outputs from each of the plurality of PUF cells prior to a current round.

According to one embodiment, assigning, in a second round subsequent to the first round, second pairings of respective ones of the plurality of PUF cells based on the results of the first round comprises assigning pairings of the respective winners of each pair of PUF cells in the first pairing; and assigning pairings of the remaining PUF cells that were not winners in the first pairing. According to one embodiment, the at least one processor is further configured to: assign, in a third round subsequent to the second round, third pairings of respective ones of the plurality of PUF cells based on the results of the first round and the second round, wherein each PUF cell of the plurality of PUF cells is paired with a PUF cell of the plurality of PUF cells having been the winner of an equal number of rounds (or pairings); and generate, in the third round, respective third outputs from each of the plurality of PUF cells and determine a winner for each pair of PUF cells in the third pairings. According to one embodiment, the at least one processor is further configured to assign additional rounds of pairings based on the results of previous rounds, wherein the total number of rounds is limited by the at least one processor to not exceed the binary logarithm of the number of PUF cells in the plurality of PUF cells.

According to one embodiment, the at least one processor is further configured to assign additional rounds of PUF cell pairings based on the results of previous rounds by: grouping, into a plurality of groups, PUF cells that have been paired in a previous round; and pairing each PUF cell in a first group with a respective PUF cell in a second group.

According to one aspect of the present application, at least one non-transitory computer readable medium storing processor-executable instructions is provided. The processor-executable instructions, when executed, cause at least one processor to perform a method comprising: assigning, in a first round, first pairings of respective ones of a plurality of PUF cells; generating, in the first round, respective first outputs from each of the plurality of PUF cells and determining results for the first round including a winner for each pair of PUF cells in the first pairings; assigning, in a second round subsequent to the first round, second pairings of respective ones of the plurality of PUF cells based on the results of the first round; generating, in the second round, respective second outputs from each of the plurality of PUF cells and determining results for the second round including a winner for each pair of PUF cells in the second pairings; and generating a PUF output based on the results of the first round and the results of the second round.

BRIEF DESCRIPTION OF THE DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear

FIGS. 4A-C show illustrative rounds of race ordering for PUF cells, in accordance with some embodiments.

FIG. 6 shows an illustrative process flow for a commitment phase for encoding a secret using a PUF, in accordance with some embodiments.

FIG. 7 shows an illustrative process flow for a recovery phase for decoding a secret using a PUF, in accordance with some embodiments.

DETAILED DESCRIPTION

Figure 1:
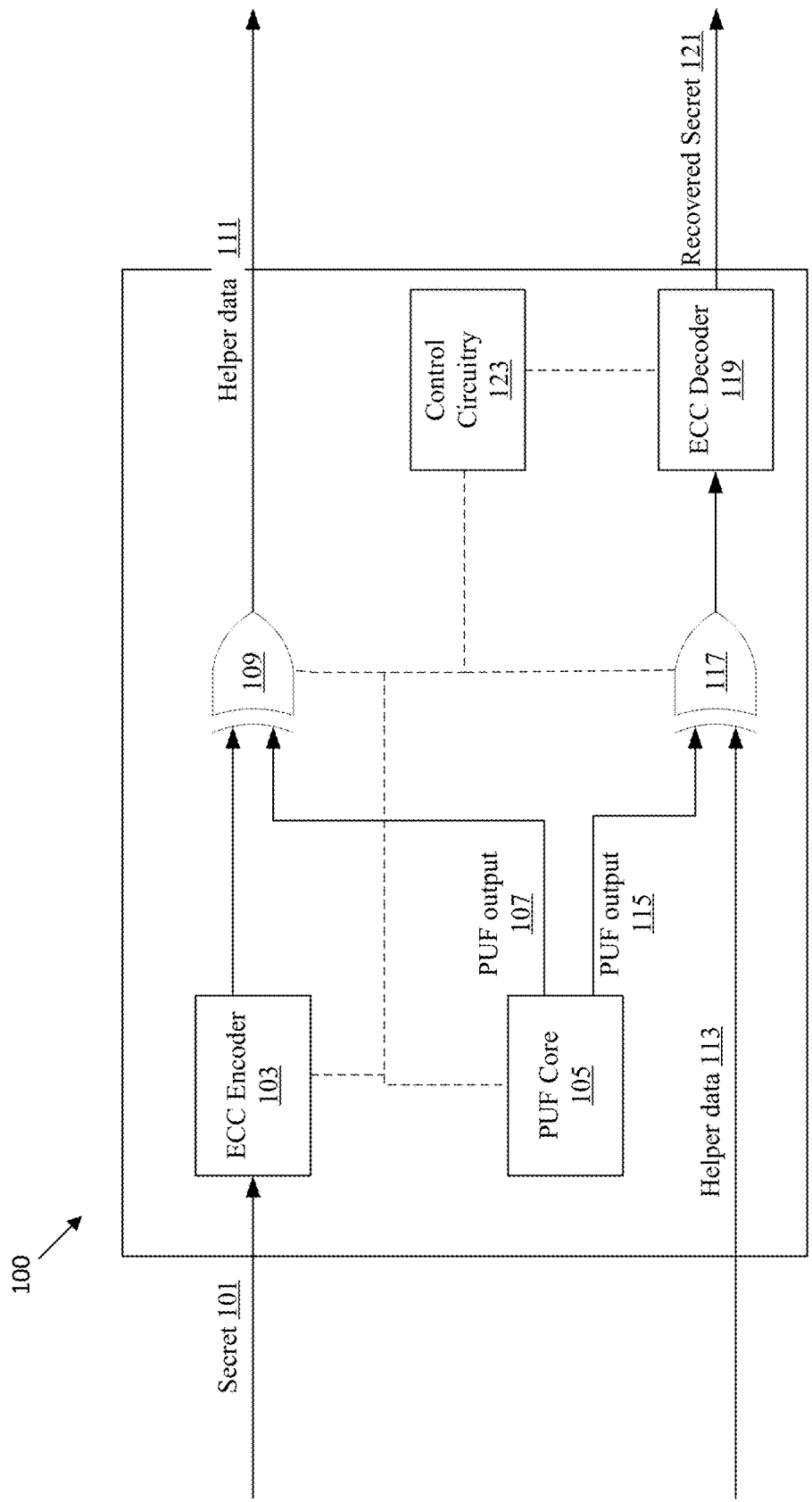
FIG. 1 shows an illustrative block diagram of a PUF based cryptography device in which some of the technology described herein may operate, in accordance with some embodiments.

According to various aspects, conventional techniques for racing PUF cells to generate output bits may be improved upon. For example, various embodiments enable reduction in the number of PUF cells required without reducing entropy. A conventional technique in using delay based PUFs provides for comparing the frequency of adjacent pairs of ring oscillators (RO) (also known as "racing") such that each ring oscillator is compared or "raced" only once. Such conventional approaches require using two ring oscillators to generate a bit of output. A second technique races adjacent ring oscillators such that each ring oscillator is raced twice. This second technique only requires one ring oscillator for each bit of output. However, the output generated by the second technique does not generate full entropy since the probabilities of the race outcomes are not independent. A third technique determines a race order based on an input challenge. This third technique does not ensure that each race produces full entropy since the outcomes of each race are not necessarily independent. Further, this third technique may be vulnerable to machine learning attacks or other inferences that determine the true ordering of the ring oscillators. Under such conditions, adversaries can predict the outcome for any input challenge.

Stated broadly, an efficient physical unclonable function implementation may utilize an optimal racing strategy to race a given number of PUF cells, such as ring oscillators, for multiple rounds in a secure manner extracting maximal entropy. According to various aspects, optimal racings strategy reduces the number of PUF cells required over conventional approaches and maintains-maximal entropy. According to one aspect, the systems and methods described herein may utilize minimal overhead compared to fixed racing strategies while reducing the number of PUF cells required, as compared to traditional racing strategies. Although some embodiments are described with respect to ring oscillator PUFs, other implementations may be practiced using any suitable delay based PUF implementation, including for example, an arbiter PUF.

Systems and methods are described herein for generating multiple rounds of races based on the previous rounds of races to preserve maximal entropy in the output of each race. In some embodiments, in each round, the winners of the previous round are raced against each other, while losers are raced against losers. As discussed, if the PUF cells with same history of winning or losing are being compared, one cannot predict the outcome of the current race based on previous race results. Thus, one ring oscillator can be used in multiple pairwise comparisons. According to various embodiments, optimal racing strategy imposes a limit for the number of rounds of race which give full entropy results. Races that are executed beyond such thresholds, risk predictability based on previous results. According to one embodiment, the system executes error correction in conjunctions with multiple racing rounds to avoid issues with error propagation. For example, PUF outputs are known to be noisy—thus to achieve consistent outputs error correction can be employed. In one implementation, the system is configured to generate and error correct result from each racing round. Based on executing error correction during the conclusion of at least one racing round, the corrected results do not propagate any errors into subsequent rounds (e.g., by misidentifying a winner or loser). In other examples, each round of racing can be error corrected prior to assigning pairings for the subsequent round and prevent the propagation of errors through subsequent rounds.

Some embodiments of the technology described herein address some of the above-discussed drawbacks of conventional technology for generating PUFs. However, not every embodiment need address every one of these drawbacks or the improvements discussed above, and some embodiments may not address any of the drawbacks. As such, it should be appreciated that aspects of the technology described herein are not limited to addressing all or any of the above discussed drawbacks of conventional PUF systems.

FIG. 1 shows an illustrative block diagram of PUF based cryptography device 100 in which some of the technology described herein may operate, in accordance with some embodiments. FIG. 1 illustrates secret 101 (e.g., a private encryption key, a secret, a random number, among other data values), PUF output (e.g., a number of bits that result from determining a PUF output) 107, helper data 111, helper data 113, PUF output 115, and recovered secret 121 (e.g., a regeneration of the secret based on the helper data) that are generated, processed, and/or controlled by error correcting code ("ECC") encoder 103, PUF core (e.g., circuitry including multiple PUF cells) 105, operator 109, operator 117, ECC decoder 119, and control circuitry 123. The cryptography device 100 may be operable and/or configured to encrypt, encode, obfuscate, decrypt, regenerate, and/or recover any suitable input values or perform such cryptographic operations on any arbitrary data in accordance with the systems and methods described herein.

In the illustrated embodiment, the device 100 can be used to encrypt and decrypt a secret 101. The secret may be any string of bits suitable for input to the device 100. The secret 101 is provided as input to the device 100 during a commitment phase that will be described below, and, in some embodiments, multiple secrets may be uniquely encoded and/or decoded using the device 100. The secret 101 may be a private encryption key, a random number, a serial number, a secret, sensitive information, or any other data that is to be kept private, including, for example, shares of a secret or key. In some embodiments, the secret 101 may be the output of a PUF. In further embodiments, the PUF output 107 may be used in place of the secret 101.

ECC encoder 103 receives the secret 101 and applies an error correcting code to compute ECC data for correcting errors in the secret 101 and the recovered secret 121. In one example, the recovered secret provides a regeneration of the encoded secret, and in particular without having to store the secret on the device. Rather, the mapping of a PUF output with a helper value to the secret provides for secure regeneration at a later time. The ECC encoder may be configured to compute ECC data using any suitable ECC code and correct any suitable number of bit errors for successfully recovering the secret. In some embodiments, the ECC encoder performs Bose-Chaudhuri-Hocquenghem (BCH) coding. The ECC decoder 119 maybe any ECC decoder or processing circuitry configured to decode and detect/correct errors using the ECC implemented by the ECC encoder 103. The ECC encoder 103 and ECC decoder 119 may be configured to correct errors in the PUF core 105 as the PUF output is determined. In one example, the ECC encoder 103 is used to generate helper data for mapping a PUF response to a secret. In further embodiments, the ECC encoder 103 and ECC decoder 119 may be configured to detect and correct bit errors arising from differences in the PUF outputs 107 and 115 used to encode and regenerate the secret. For example, even where a PUF output used for decoding is noisy, ECC decoder 119 can reliably regenerate a secret so long as the PUF output is within a correctable number of bit errors (e.g., determined by the ECC encoding parameters) from the encoded value as provided by the helper data.

PUF core 105 may be used to generate PUF outputs for encrypting and decrypting the secret 101. The PUF core 105 may include circuitry that generates an output dependent on unique physical properties of one or more PUF cells in the PUF core 105. For example, variations in manufacturing processes and parts may produce a chip comprising electrical circuits with unique hardware characteristics. The PUF core 105 may include one or more electrical circuits that generate outputs based on the unique hardware characteristics specific to the one or more electrical circuits. Examples of PUF core types include arbiter PUFs, RO PUFs, butterfly PUFs, other delay-based PUFs, or any PUF implementation that compares values from identically designed circuits. In some embodiments, the PUF core 105 is instructed, for example by the control circuitry 123, to generate a PUF output (e.g., 107 or 115) and produces a PUF output that is not based on any input value to the PUF core 105. For example, the PUF core 105 can return a response value based on racing pairs of PUF cells without a specific challenge request.

In some embodiments, the PUF core 105 can be configured to receive a challenge input that is used to specify initial PUF cells pairings to compute the PUF output. In some examples, the control circuitry 123 may specify the first round of pairings or an initial set of pairing can be predefined. In further embodiments, the challenge input indirectly specifies the first round of pairings by mapping from a limited number of valid inputs to first round pairings that remain secret to the encryption device.

PUF outputs 107 and 115 are responses obtained from the PUF core and/or PUF cells (e.g., strings of bits suitable for obfuscating the secret 101). In some embodiments, each PUF output includes a number of bits (e.g. 32, 64, 128, or 256 bits) of entropy obtained by racing pairs of PUF cells. In some embodiments, each bit in the PUF output represents a full bit of entropy. PUF outputs 107 and 115 may be identical in the absence of errors during PUF output generation. PUF outputs 107 and 115 may be different, for example since PUFs may be noisy, but the secret 101 may be successfully recovered if the PUF outputs 107 and 115 differ by no more than a maximum number of bits that can be corrected by an ECC (e.g., an ECC implemented by ECC encoder 103 and ECC decoder 119). In some embodiments, PUF output 107 is used during the commitment phase with the error correcting code data appended to the secret 101 to produce helper data 111 for the subsequent regeneration of the secret value with PUF output 115 during the recovery phase. In some embodiments, the ECC decoder 119 is used to decode a portion of the recovered secret 121 recovered using a portion of the PUF output 115—for example, correcting an output derived from a racing round. In further embodiments, detected and/or corrected errors are communicated to the PUF core 105 for generating further portions of the PUF output 115, and multiple corrected portions can be combined for secret regeneration. Error correction of PUF output is discussed with reference to FIGS. 5A-B.

In some embodiments, the PUF outputs (e.g., 107 and 115) may be used as a secret. For example, a PUF output may be used as a unique device identifier, as an encryption key, as a secret to be encrypted or obfuscated using a second PUF output, or for any other suitable purpose. In some embodiments, the PUF output 107 may be used in place of the secret 101 and input to the ECC encoder 103. In further embodiments, the ECC data generated based on the PUF output (e.g. 107) may be stored as the helper data 111 for recovering the secret PUF output.

In some embodiments, each output of the PUF core 105 is generated in rounds. In some embodiments, the generation of a PUF output is controlled by control circuitry 123 or a processor (e.g., CPU, FPGA, etc.). In some embodiments, the control circuitry (e.g., 123) or processor can be included in the PUF core 105.

In some embodiments, in a first round, respective pairings are assigned to a plurality of PUF cells in the PUF core 105. In some embodiments, the first pairing may be any suitable mapping of pairs that can be reproduced for regenerating the PUF output. For example, if the mapping of pairs used to generate the PUF output 107 is used for the first pairing for generating the PUF output 115, the resulting PUF outputs 107 and 115 may match (e.g., as corrected for errors). If the first round mapping of pairs is changed, outputs are unlikely to match.

In one example, the first round of pairings may pair adjacent PUF cells. In some embodiments, the PUF cells are ordered and/or numbered 1 through N. In the first round, odd numbered PUF cells may be paired with an adjacent even numbered PUF cell, e.g., pairing PUF cells 1 and 2, PUF cells 3 and 4, PUF cells 5 and 6, . . . , and PUF cells N−1 and N. In further embodiments, the PUF cells are paired with an available PUF cell separated by N/2 spaces or another suitable distance. In other embodiments, the first round of PUF cell pairings represent an arbitrary pairwise mapping of PUF cells.

Each pair of PUF cells in the first pairing may be raced by causing and/or enabling each PUF cell in the pair to generate an output. In some embodiments, based on a binary comparison of the outputs, one PUF cell of each pair is determined to be the winner and one PUF cell of each pair is determined to be the loser. For example, when the PUF cells include ring oscillators, output transitions of each oscillator may be counted for a period of time and compared, with the higher frequency oscillator producing a greater number of counts and being determined to be the winner. In some embodiments, an arbitrator based PUF may associate an arbitrator output with each of two delay paths. It should be appreciated that components of other delay based PUFs may be used as suitable PUF cells.

When racing PUF cells that have not been previously paired with each other and/or a common opponent, a full bit of entropy may be generated by the outcome of the race since there is not a priori information that can be used to predict the outcome of the race. In some embodiments, N PUF cells are raced in N/2 pairs per round. Therefore, in each round that PUF cells are paired without common opponents, N/2 bits of entropy may be generated. In two rounds, N PUF cells may generate N bits of entropy. In four rounds, N PUF cells may generate 2*N bits of entropy (e.g., 64 PUF cells may generate 128 bits of entropy in four rounds). According to some embodiments, in order to guarantee that each race produces a full bit of entropy, the number of rounds of pairings may be limited to the binary logarithm of the number of PUF cells, N. In one example, after this point, the race ordering of PUF cells is largely determined and future races will yield less than a full bit of entropy each. It should be appreciated that the degree to which the race order is determined after a given number of rounds can vary based on the process differences that determine the differences in PUF cell outputs and may be unique to each device. In some embodiments, rounds of races may proceed after the binary logarithm of the number of PUF cells, with potential loss of entropy.

The pairings of PUF cells may be selected by the PUF core 105 and/or control circuitry 123 to ensure that paired PUF cells have no common past opponent. In some embodiments, the selection is performed actively, for example by tracking the set of opponents faced by each PUF cell and selecting pairs whose sets of opponents have a null intersection. In further embodiments, the race ordering groups the PUF cells to prevent common past opponents.

In some embodiments, the race ordering is used to create conditions for full entropy to be generated by each pairing and/or race. In the first round, PUF cells cannot possibly have common opponents since no races have been performed. Each winner in the first round may be paired with another winner from the first round and each loser is paired with another loser. In a second round assigned in this fashion, no PUF cell pair can have an intersecting history of opponents, since each winner (loser) previously raced exactly one respective loser (winner). In some embodiments, a third round of pairings is assigned such that winners (losers) of the previous round are paired with winners (losers) of the previous rounds. In some embodiments, PUF cells are paired that have the same record and that won and/or lost races in the same order. In some embodiments, PUF cells are raced at most or exactly once per round. Racing each PUF cell at most once per round may ensure that each race produces a full bit of entropy.

Various embodiments of systems and methods for PUF based encoding are further described with reference to FIGS. 3, 4A-C, 5A-B, 8, and 9.

In some embodiments, an output of the PUF core 105 may be noisy. For example, the differences between some PUF cells may be sufficiently small that the cells are considered weak and may be prone to errors during PUF output generation. In some embodiments, the PUF cells in the PUF core 105 may have temperature sensitive outputs. For example, the frequency of ring oscillator PUF cells may vary at different rates as a function of temperature and weak cells may have their frequencies cross over at a certain temperature. In further embodiments, a configuration signal is provided to the PUF core 105 to produce more reliable and robust PUF cells. The configuration signal may be used, for example at the time of manufacture, to configure the outputs of PUF cells to remain sufficiently separate at operating temperatures. In some embodiments, the PUF cells are configured based on the first round pairing to provide a more reliable race result. Examples of the configuration signal and configuration of the PUF cells is discussed with reference to FIG. 2A.

According to one embodiment, the output of PUF Core 105 is received by the operator 109. The operator 109 may be any suitable operator (e.g., a bitwise XOR gate or an arithmetic and logic unit, among other circuits) for using the PUF 107 to obfuscate the secret 101 such that helper data 111 cannot be used to determine the secret 101 without the correct PUF output. The operator 109 may be any invertible operation to allow for recovery of the secret 101 from helper data 111 and a PUF output. In some embodiments, the operator 109 is a bitwise XOR operation, which may be its own inverse. In some embodiments, the operators 109 and 117 may both be bitwise XOR operations. In some embodiments, the operator 109 is a masking operation that changes the output bits that correspond to bits in the secret 101 based on the PUF output 107. In further embodiments, the operator 109 is a cryptographic encoder and the operator 117 is a corresponding decoder. The operator 117 is used to undo the obfuscation of the secret 101 performed by the operator 109 to recover the secret 101.

Recovered secret 121 may be recovered from the helper data 113. The recovered secret 121 will match the secret 101 if the helper data 113 matches helper data 111. In some embodiments, it is anticipated that helper data 113 will match the helper data 111, but it should be appreciated that device errors or an adversary may cause the helper data 113 to differ from the helper data 111. In which case, the secret would not be recovered. In further embodiments, the device may encode more than one secret, with each secret being committed and mapped to respective helper data, and each secret may only be regenerated using the correct respective helper data. To generate the recovered secret 121 (e.g., to decrypt the secret 101) the PUF core 105 generates a second PUF output 115. In some embodiments, the PUF core 105 operates on a comparison basis between PUF cells (e.g., based on pairings assigned by the control circuitry 123), and the value of each output of the PUF core 105 can be independent of any input to the PUF core 105. The PUF outputs 107 and 115 can be expected to be equal after being decoded with an error correcting code. The recovered secret 121 may be generated without revealing any PUF output.

The control circuitry 123 may be any suitable processing circuitry such as a microprocessor, a field programmable gate array (FPGA), an application specific integrated circuit (ASIC), or any other suitable circuitry for controlling PUF output generation, timing, and pairings. In some embodiments, the control circuitry is used to control whether the device 100 is in a specific configuration mode. In one example, the configuration modes include a commitment phase for encoding or binding a secret to respective helper data, or a recovery phase for regenerating a bound secret.

In some embodiments, the encryption device generates a helper data from the secret 101 during a commitment phase. In some examples, the encoded helper data 111 can securely be made public. In other examples, the helper data 111 can be provided to operators or devices participating in PUF based encoding operations. In some embodiments, the device 100 is configured to be in the commitment phase by control circuitry 123. In some embodiments, the control circuitry 123 receives an external signal to begin the commitment phase.

During the commitment phase, the secret 101 is encrypted, encoded, and/or obfuscated using a PUF. The encryption device obtains the secret 101 using any suitable input. The ECC encoder 103 applies an ECC to the secret 101 to produce ECC data that is appended to the secret 101 for further processing. The PUF core 105 generates a PUF output 107. The PUF output 107 may be input to an ECC encoder (e.g., 103) to provide error correction data for future PUF output generation. The operator 109, e.g. XOR, is applied to the PUF output and the secret 101 with appended ECC data to generate the helper data 111.

During the recovery phase, the recovered secret 121 is generated from the helper data. The encryption device obtains the helper data 113 using any suitable input. The PUF core 105 generates the PUF output 115. In some embodiments, error correcting codes ensure that PUF output 115 matches the PUF output 107 used in the commitment phase. The operator 117 performs the inverse of the operator 109, which was used to obscure the secret 101 during the commitment phase, to generate an estimate of the secret 101. The ECC decoder 119 decodes the estimated secret and ECC data that was appended during the commitment phase to produce the recovered secret 121. According to one example, provided the helper data 113 matches the helper data 111, the recovered secret 121 matches secret 101.

Figure 2A:
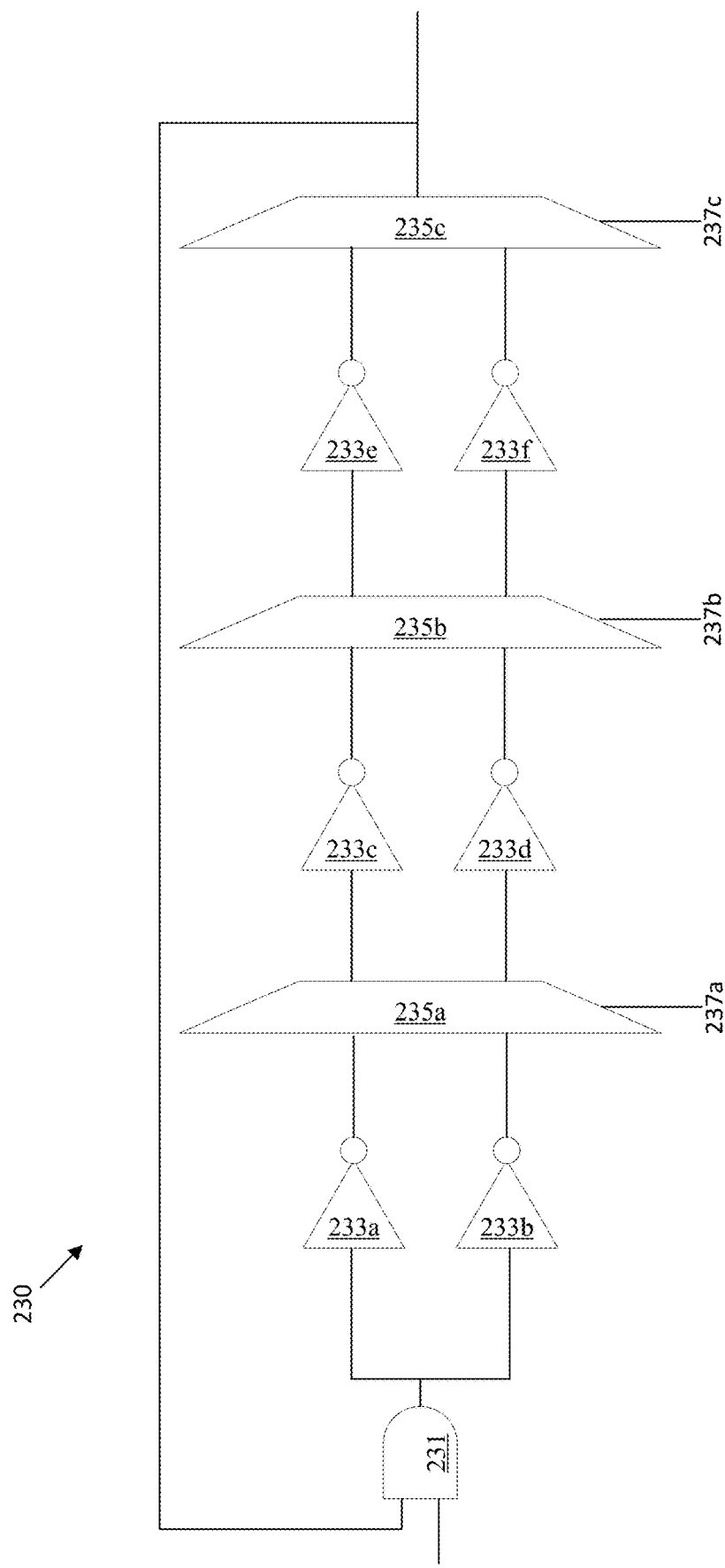
FIG. 2A shows an illustrative block diagram of a PUF cell used to generate a PUF output, in accordance with some embodiments.

FIG. 2A shows an illustrative block diagram of a PUF cell 230 used to generate a PUF output, in accordance with some embodiments. FIG. 2A illustrates a ring oscillator including AND gate 231, inverters 233a-f, switches 235a-c, and configuration inputs 237a-c. In the illustrative embodiment, the PUF cell 230 is a ring oscillator circuit that generates an output that oscillates between logical one and zero. Due to process variations, there may be differences between the observed frequencies of oscillation for ring oscillators designed to operate at the same frequency.

AND gate 231 combines the output of the ring oscillator with an input signal. The input signal may be provided by control circuitry (e.g. 123). In the illustrative embodiment, an input of zero disables the ring oscillator, since the output of the AND gate 231 will be held at zero and will not oscillate. In the illustrative embodiment, an input of 1 can be used to enable to the ring oscillator, for example in order to race the oscillators. In some embodiments, multiple PUF cells may be enabled substantially simultaneously (e.g., using a shared signal line).

Inverters 235a-f logically invert received input and form a logical loop based on the configuration of the switches 235a-c. In some embodiments, PUF cell 230 may be a ring oscillator that employs an odd number of inverters without configurable paths (for example as in FIG. 2B).

Switches 235a-c may be used to configure the PUF cell 230 by establishing signal paths for the ring oscillator. In some embodiments, the switches 235a-c may one or more multiplexers or any suitable switch element.

In some embodiments, the PUF cell may be configured by applying configuration signals to inputs 237a-c. In some embodiments, the inputs 237a-c may be used to select a signal path for the ring oscillator. In the illustrative embodiment of FIG. 2A, the switches 235a-c and inputs 237a-c may be used to select one of eight possible paths through the inverters 233*a-f*. For example, the ring oscillator may utilize just one of the inverters 233*a-b*, one of the inverters 233*c-d*, and one of the inverters 233*e-f*. In some embodiments, each PUF cell is configured once, for example during the manufacturing process. In some embodiments, configurations are chosen to increase the reliability of weak PUF cells and produce more reliable race outcomes.

Figure 2B:
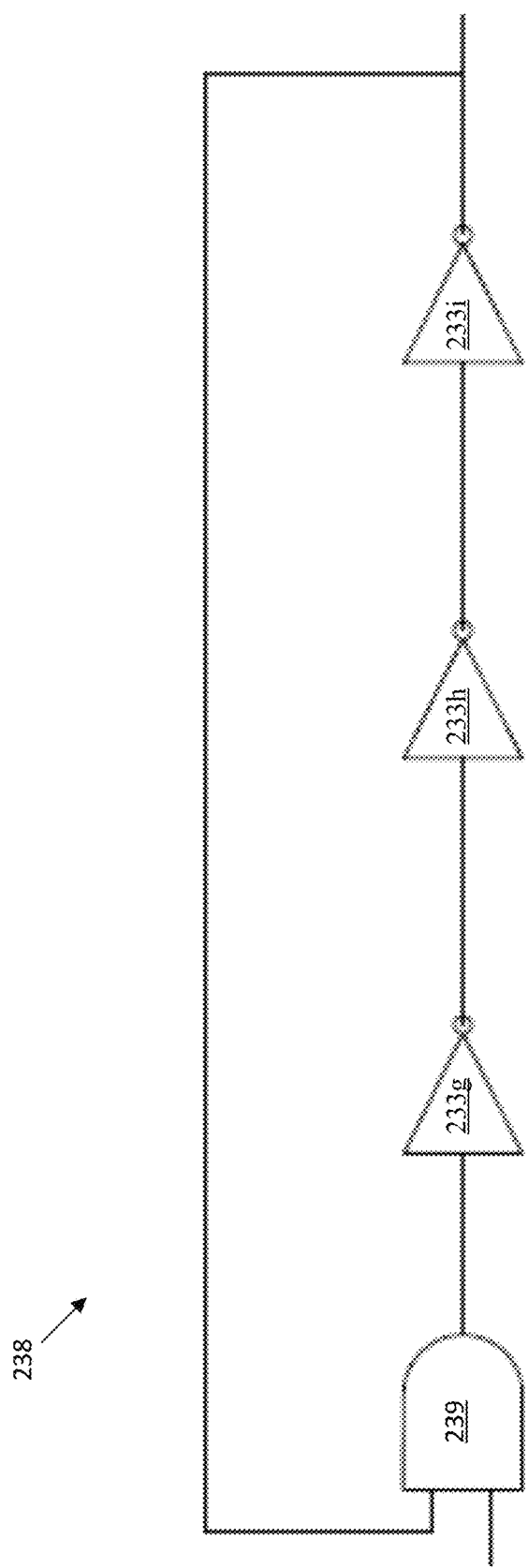
FIG. 2B shows an illustrative block diagram of a PUF cell used to generate a PUF output, in accordance with some embodiments.

FIG. 2B shows an illustrative block diagram of a PUF cell 238 used to generate a PUF output, in accordance with some embodiments. FIG. 2B illustrates a ring oscillator including AND gate 239 and inverters 233*g-i*. In the illustrative embodiment of FIG. 2B, the PUF cell 238 is a ring oscillator circuit that generates an output that oscillates between logical one and zero. Due to process variations, there may be differences between the observed frequencies of oscillation for ring oscillators designed to operate at the same frequency.

AND gate 239 combines the output of the ring oscillator with an input signal. The input signal may be provided by control circuitry (e.g. 123). In the illustrative embodiment, an input of zero disables the ring oscillator, since the output of the AND gate 239 will be held at zero and will not oscillate. In the illustrative embodiment, an input of 1 can be used to enable to the ring oscillator, for example in order to race the oscillators. In some embodiments, multiple PUF cells may be enabled substantially simultaneously (e.g., using a shared signal line).

Inverters 235*a-f* logically invert received input. The output of the inverter 233*i* is fed back into the AND gate 239 to create continuing oscillation. In some embodiments, the output of the inverter 233*i* may be buffered in any suitable manner. In some embodiments, the output of the inverter 233*i* is provided to a multiplexer, counter, comparator, and/or any other suitable circuit element for comparing PUF cell (e.g. 230 and 238) outputs.

Figure 3:
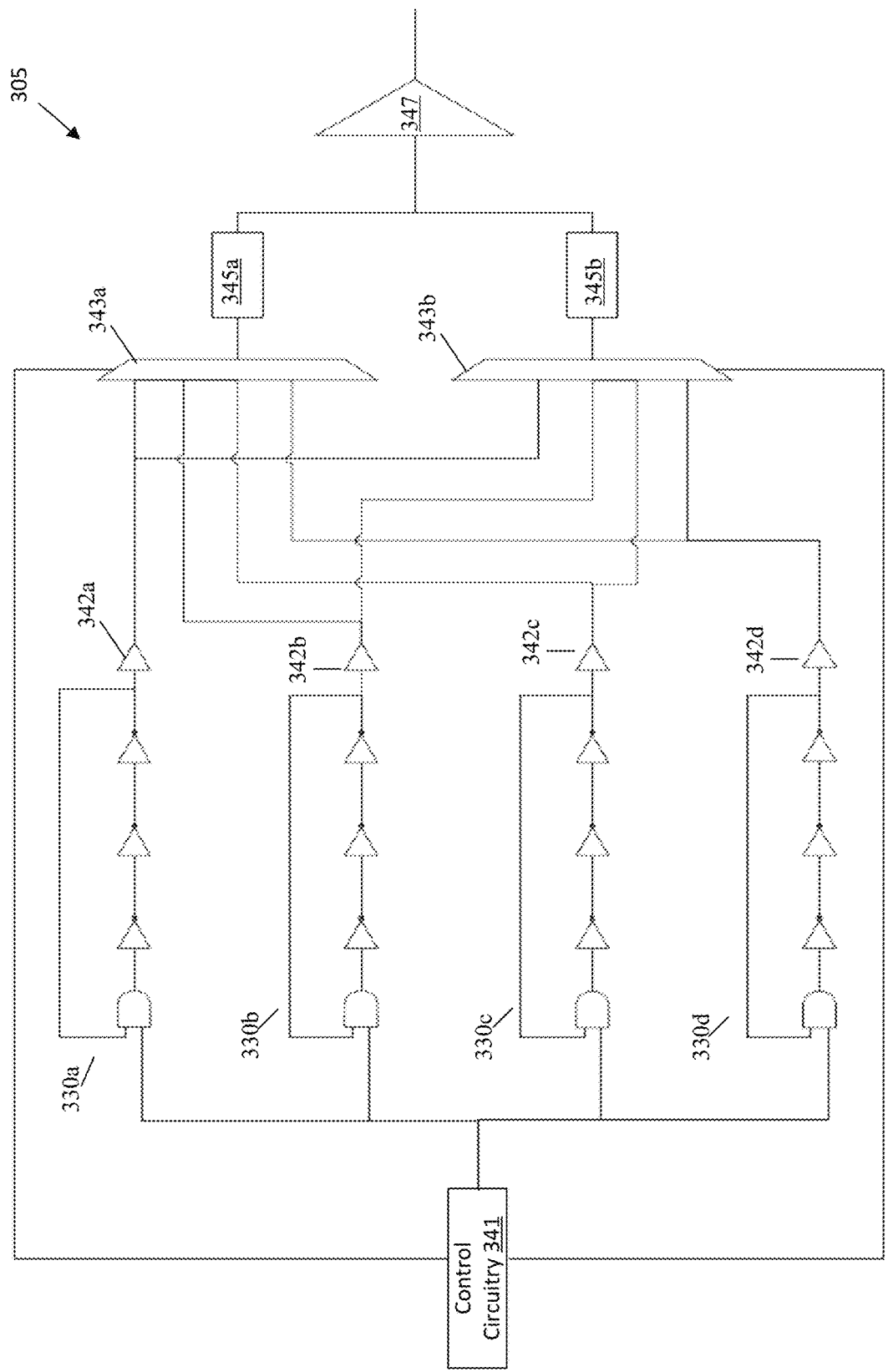
FIG. 3 shows an illustrative block diagram of a PUF core for generating a PUF output, in accordance with some embodiments.

FIG. 3 shows an illustrative block diagram of a PUF core 305 for generating a PUF output, in accordance with some embodiments. FIG. 3 illustrates control circuitry 341, PUF cells 330*a-d*, output buffers 342*a-d*, multiplexers 343*a-b*, counters 345*a-b*, and comparator 347. In some embodiments, the PUF core 305 may include sufficiently many multiplexers, counters, and comparators to pair all of the PUF cells 330*a-d* and race each pair in parallel. For example, by including one multiplexer for each PUF cell 330*a-d* to be raced in each round.

In some embodiments, the PUF core 305 is configured to race one or more pairs of PUF cells iteratively, for example to reduce the power consumption of the PUF core 305. In some embodiments, the PUF cells 330*a-d* are configured to begin racing in parallel. In further embodiments, the output of each PUF cell is latched and/or temporarily stored for subsequent comparison.

Control circuitry 341 enables the generation of output from each of the PUF cells. In some embodiments, each PUF cell only generates an output in response to a signal from the control circuitry 341. In some embodiments, the control circuitry assigns pairings of PUF cells by controlling PUF cell inputs. In some embodiments, the outputs of the PUF cells are connected to multiplexers and the control circuitry 341 controls which PUF cells are being raced using the multiplexers 343*a-b*.

The PUF cells 330*a-d* generate outputs based on the unique hardware characteristics specific to each PUF cell circuit. Examples of PUF cells include RO PUFs, arbiter PUFs, other delay based PUFs, or any PUF implementation usable for comparing output values. It should be appreciated that any property unique to the device that can be determin- istically measured and compared without being predicted in advance may be used to generate a PUF output.

The outputs of each of the PUF cells 330*a-d* are buffered by a respective one of the output buffers 342*a-d*. The output buffers 342*a-d* may be any suitable circuitry for buffering the outputs of each of the PUF cells 330*a-d*. Each of the multiplexers 343*a-b* are used to select the output of one of the PUF cells 330*a-d* to form a pair of PUF cells. The control circuitry 341 assigns PUF cell pairings and configures the inputs of each multiplexer 343*a-b* to race the pair of PUF cells. In some embodiments, each of the multiplexers 343*a-b* are connected to all, a subset, or any suitable combination of the PUF cells 330*a-d*.

The counters 345*a-b* receive the output of the PUF cells being raced and measure a comparable output. In some embodiments, the PUF cells are ring oscillators and the counters count transitions in the PUF cell output to determine a measure of the frequency. In some embodiments, the counter may be an analog to digital converter, or another suitable circuit element for generating an output suitable for comparison. In some embodiments, the counters 345*a-b* may latch PUF cell outputs for subsequent comparison.

The comparator 347 receives and compares the output of the counters 245*a-b*. In some embodiments, the comparator is an arbiter or other suitable binary comparator for determining a winner and loser of each pair of PUF cells. In some embodiments, the comparator generates an output bit. The output bit may represent a full bit of entropy as was discussed with reference to PUF cell pairings in FIG. 1. To generate a suitable number of bits of entropy, e.g. 32, 63, 128, or 256 bits of full entropy, the PUF core 305 may pair and race the PUF cells in multiple rounds using pairings that may depend on the results of previous rounds.

FIGS. 4A-C show illustrative rounds of race ordering for PUF cells 430*a-h*, in accordance with some embodiments. FIG. 4A represents an illustrative first round of pairings 351*a-d*. FIG. 4B represents an illustrative second round of pairings 353*a-b* and 355*a-b*. FIG. 4C represents an illustrative third round of pairings 357*a-b* and 359*a-b*. In the illustrative embodiment of FIGS. 4A-C, eight PUF cells 430*a-h* are raced, and limiting the number of rounds to the binary logarithm of the number of PUF cells, 3 rounds in FIGS. 4A-C, allows for a full bit of entropy to be generated by each race. Additionally, according to one embodiment, PUF cells are raced once per round. Racing a PUF cell once per round may ensure that each race produces a full bit of entropy. In the example of FIGS. 4A-C, the speed of the PUF cells 430*a-h* decreases in alphabetical order, e.g. PUF cell 430*a* will win against PUF cell 430*b*, which will win against PUF cell 430*c*, which will win against PUF cell 430*d*, and so on to the slowest PUF cell 430*h* that will not win any rounds. The ordering of the speed of the PUF cells is not known to the PUF core before any races and is provided for illustration only. The PUF cells 430*a-h* may exhibit any ordering of speeds for each PUF device, and each ordering may be unique to the device.

FIG. 4A shows an illustrative first round of pairings and races. In the first round, each PUF cell is paired with an adjacent PUF cell. PUF cell 430*a* is paired with PUF cell 430*b*. Each PUF cell in the pair generates an output and PUF cell 430*a* is determined to be the winner of race 351*a*. PUF cell 430*c* is paired with PUF cell 430*d*, and PUF cell 430*c* is the winner of race 351*b*. PUF cell 430*e* is paired with PUF cell 430*f*, and PUF cell 430*e* is the winner of race 351*c*. PUF cell 430*g* is paired with PUF cell 430*h*, and PUF cell 430*g* is the winner of race 351*d*. The races 351*a-d* each generate a full bit of entropy. The pairings for subsequent rounds will be determined based on the results of the first round shown in FIG. 4A.

FIG. 4B shows an illustrative second round of pairings and races. In the example of FIG. 4B, races 353*a-b* are between PUF cells with one win are shown on the right side of FIG. 4B. Races 355*a-b* are between PUF cells with one loss and shown on the left side of FIG. 4B.

In the example of FIGS. 4A-B, the pairings for races 353*a-b* and 355*a-b* are determined by selecting two pairs (e.g. from races 351*a* and 351*b*) from the first round and pairing the winners of each selected pair and the losers of each selected pair. In some embodiments, the pairs are sequentially ordered, and the second round ordering is determined by pairing the race winner (loser) of pair i with the winner (loser) of pair i+1.

In the example of FIG. 4B, PUF cell 430*a* and 430*c* are paired since each won races 351*a* and 351*b* respectively. Correspondingly, PUF cells 430*b* and 430*d* were the losers of races 351*a* and 351*b* and are paired in the second round. Additionally, PUF cells 430*e* and 430*g* are paired since each won races 351*c* and 351*d* respectively. PUF cells 430*f* and 430*h* were the losers of races 351*c* and 351*d* and are paired in the second round.

FIG. 4C shows an illustrative third round of pairings and races. In the third round, in some embodiments, winners (losers) of the previous round may be paired with a winner (loser) in the previous round. In some embodiments, PUF cells are paired based on whether each cell won or lost a respective race between PUF cells that had won or lost two rounds prior. For example, PUF cells 430*b* and 430*f* are raced after winning the losers' side of FIG. 4B.

In some embodiments, PUF cells with identical records are paired. In further embodiments, the PUF cells raced in the third round did not race any of the same PUF cells in either of the first or second round. In some embodiments, PUF cells are paired such that the PUF cells in the pair won and lost their respective races in the same order. For example, PUF cells 430*b* and 430*f* are paired in round 3 after having lost in round 1 and won in round 2.

In some embodiments, the PUF cells 430*a-h* are grouped by combining pairs of PUF cells. The grouping of PUF cells may be done virtually using any suitable data structure or ordering of race control signals. In some embodiments, groups of PUF cells may be sequential and/or contiguous portions of an ordered list of PUF cells. For example, in some embodiments, a new group may be considered to contain a number, two to the power of the number of rounds (2^r, where r is the number of rounds), of contiguous PUF cells. In further embodiments, groups of PUF cells are tracked using one or more hash tables, memory arrays, or look up tables.

PUF cells may be grouped such that PUF cells that have been paired in a previous round are grouped together. In some embodiments, subsequent rounds of pairings are assigned by selecting two groups of PUF cells and pairing each PUF cell in the first group with a respective PUF cell in the second group. In the example of FIG. 4A, the PUF cells in each race 351*a-d* may form groups with two PUF cells each. In the example of FIG. 4B, the group with PUF cells 430*a-b* and the group with PUF cells 430*c-d* are combined to form a group with PUF cells 430*a-d*. A second group may be formed to include the other half of the PUF cells, PUF cells 430*e-h*. The groups containing half of the PUF cells are used to assign pairings for the third round. By selecting pairs with one PUF cell each in one of two groups, there is no intersection in the previous race opponents of either PUF cell since all previous race opponents of a PUF cell will be in the same group. Therefore, the PUF core will have no a priori information about the outcome of the races and a full bit of entropy will be generated.

In some embodiments, grouping PUF cells may be used to assign specific pairings. For example, in addition to pairing PUF cells that have won an identical number of pairings, it may be desirable to pair PUF cells that won or lost pairings in the same order. In the example of pairing each PUF cell in a first group with each PUF cell in a second group, beginning with the pairs in round 2, since each PUF cell in a pair has a same record and one PUF cell wins and one PUF cell loses, each PUF cell has a series of wins and losses that is different from the wins and losses of each other PUF cell in the group in at least one round. Therefore, each PUF cell in the group has a unique series of wins and losses. Furthermore, since the number of PUF cells in each group is equal to the number of possible orderings of wins and losses, two to the power of the number of rounds, each group has one PUF cell for each possible unique series of wins and losses. Pairings for subsequent rounds may therefore be made by matching PUF cells with identical records since the groups paired in the exemplary manner are identically sized. Groups of PUF cells may be combined or paired in any suitable manner. In some embodiments series of wins and losses may be tracked using a lookup table, array, bitmap, or any suitable data structure.

As discussed above, after the number of rounds exceeds the binary logarithm of the number of PUF cells ($\log_2(N)$, where N is the number of PUF cells) the entropy of each pairing may be less than a full bit. In some embodiments, the PUF core may proceed with additional rounds to further determine the race order of the PUF cells. For example, the PUF core may race PUF cells that were winners (losers) in the previous round against another winner (loser) of the previous round if two paired cells have not been paired previously. In some cases, these additional races may yield zero information depending on the topology of the PUF cells. For example, it may be evident from the transitive property that one PUF cell will win against a paired PUF cell if the PUF cells won and lost respectively to the same opponent.

Figure 5A:
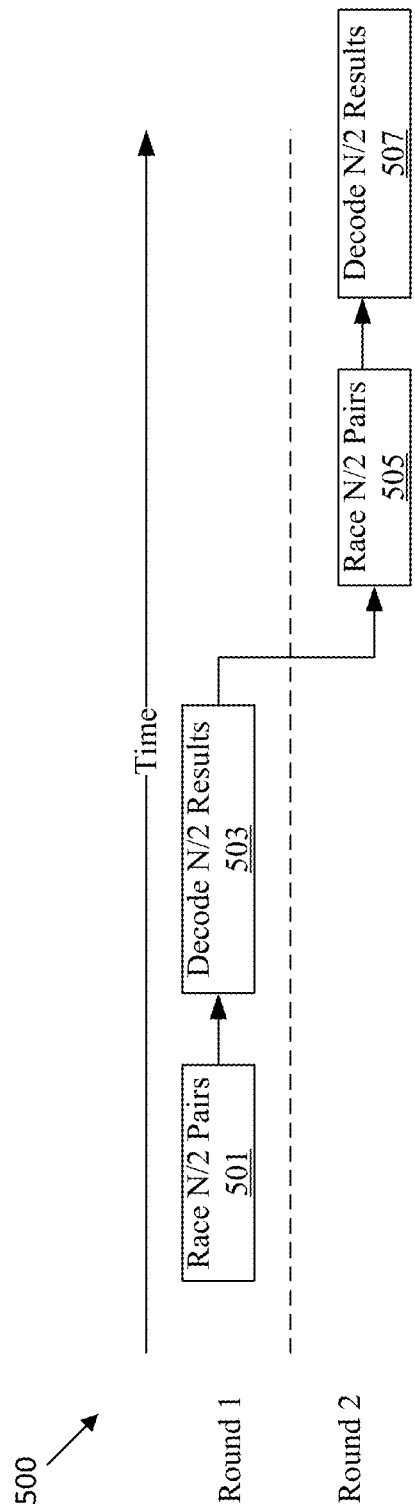
FIGS. 5A-B show illustrative timing diagrams for racing PUF cells and generating error corrected results, in accordance with some embodiments.

FIG. 5A shows an illustrative timing diagram for racing PUF cells and generating error corrected results, in accordance with some embodiments. FIG. 5A illustrates a process flow 500 that may be executed using a plurality of PUF cells, for example by a PUF core (e.g., 105).

Process flow 500 begins at act 501 where, in some embodiments, N PUF cells are raced in N/2 pairs. In some embodiments, the races in act 501 may be run iteratively, and decoding may be performed after certain numbers of iterations. The N/2 pairs of PUF cells may be raced, for example, as was described with reference to FIGS. 1, 3, 5, 8, and 9.

At act 503 the results of the N/2 races, N/2 bits, are decoded using any suitable error correcting code (e.g., ECC decoder 119). In some embodiments, the outputs of any PUF cell may be noisy. In some embodiments, the PUF cells may be configured to produce robust comparison, for example races that are not affected by each PUF cell's response temperature, but it still may be possible to have weak PUF cells or close, noisy races. In some embodiments, the error correction may be performed using an ECC decoder (e.g. 119) that is shared with different portions of a cryptography device (e.g. 100). In some embodiments, ECC data is created for each round of race results during the encryption/commitment phase.

At act 505, a second round of races is performed using pairings based on the results of the first round. In the illustrative embodiment of FIG. 5A, each pairing in act 505 is not determined until after the results necessary to determine the pairing are decoded in act 503. In some embodiments, all first round results are decoded simultaneously in the same error correcting process. In some embodiments, the assignment of second round pairs does not begin until all of the first round results have been decoded. In some embodiments, portions (e.g., 8, 16, 32, or 64 races) races are decoded and a second round of pairings may be chosen based on decoded portions of the first round of results. In some embodiments, the second round of races proceeds speculatively once the races in act 501 are complete. The results of speculative races may be confirmed as valid results if there are no errors detected in act 503. If an error is detected, the results of speculative races may be discarded and/or invalidated, and at least the races affected by the error may be repeated.

Process flow 500 ends at act 507, when the results of the second round of races are decoded using an error correcting code similarly to act 503. In some embodiments, the decoded results are provided as output, a PUF output, and N bits of entropy from N races and N PUF cells is sufficient. In some embodiments, the number of PUF cells, N, may be smaller than the desired number of bits of entropy and the process flow will continue with additional rounds in a similar serialized manner.

Figure 5B:
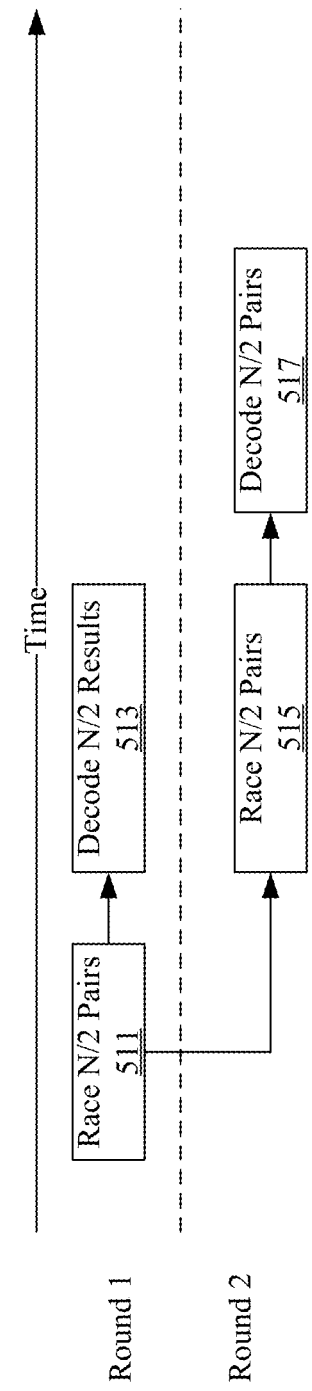

FIG. 5B shows an illustrative timing diagram for racing PUF cells and generating error corrected results, in accordance with some embodiments. FIG. 5B illustrates a process flow 510 that may be executed using a plurality of PUF cells, for example by a PUF core (e.g., 105).

Process flow 510 begins at act 511 where, in some embodiments, N PUF cells are raced in N/2 pairs. The N/2 pairs of PUF cells may be raced, for example, as was described with reference to act 501 and FIGS. 1, 3, 5, 8, and 9.

At act 513 the results of the N/2 races, N/2 bits, are decoded using any suitable error correcting code (e.g., ECC decoder 119). In some embodiments, the outputs of any PUF cell may be noisy. In some embodiments, the PUF cells may be configured to produce robust comparison, for example races that are not affected by each PUF cell's response temperature, but it still may be possible to have weak PUF cells or close, noisy races. In some embodiments, the error correction may be performed using an ECC decoder (e.g. 119) that is shared with different portions of a cryptography device (e.g. 100).

In some embodiments, the decoded results are used in the final PUF output value but are not needed for the remaining acts of the process flow 510 and may be decoded at any suitable time. In some embodiments, the decoding in acts 513 and 517 may be performed substantially simultaneously.

At act 515, a second round of races is performed using pairings based on the results of the first round. In the illustrative embodiment of FIG. 5B, each pairing in act 515 is determined without error corrected results of the races in act 511. Since pairs are assigned based on the results of the previous round, a bit error in the output may result in two erroneous pairings in the second round and, therefore, two errors in the results of the second round. In some embodiments, errors may propagate such that the number of bit errors may double each round. Correcting this error propagation may require a substantially more complex error correcting code than is required for the serialized process flow 500. For example, it may be necessary for error correction in the process 510 to operate on all results simultaneously and/or detect/correct more than twice as many errors.

Process flow 510 ends at act 517, when the results of the second round of races are decoded using an error correcting code similarly to act 513. In some embodiments, the decoded results are provided as output, a PUF output, and N bits of entropy from N races and N PUF cells is sufficient. In some embodiments, the number of PUF cells, N, may be smaller than the desired number of bits of entropy and the process flow will continue with additional rounds.

FIG. 6 shows an illustrative process flow 600 for a commitment phase for encoding a secret using a PUF, in accordance with some embodiments. The process illustrated in FIG. 6 may be executed by a cryptography device (e.g., 100) that is configured to generate a PUF output (e.g., 107 and 115). In some embodiments, the process 600 binds or maps a secret to helper data generated using the PUF.

The example process flow 600 begins at step 601, where the encryption device obtains a secret K. The secret may be any series of bits suitable for input to the encryption device that the user of the device wants to remain secret, for example a private cryptography key. The secret is provided as input to the device, and, in some embodiments, multiple secrets may be uniquely encrypted and decrypted using the device.

At act 603, the encryption device uses an ECC encoder (e.g., 103) to apply an ECC to the secret K in order to produce ECC data. At act 605, the ECC data generated by the ECC encoder is appended to the secret K. The ECC data may also be stored in any suitable storage medium and may be associated with the secret without being directly appended. The ECC encoder may be configured to compute ECC data using any suitable ECC code and correct any suitable number of bit errors for successfully recovering the secret. In some embodiments, the ECC encoder performs Bose-Chaudhuri-Hocquenghem (BCH) coding.

At act 607, the encryption device generates a PUF (e.g., PUF 107) using a PUF core (e.g., PUF core 105). The PUF core may be any suitable circuit or system for generating a PUF. In some embodiments, the PUF core may include circuitry that generates an output dependent on unique physical properties of one or more PUF cells that may be included in the PUF core. For example, variations in manufacturing processes and parts may produce a chip comprising electrical circuits with unique hardware characteristics. Examples of PUF cells include ring oscillators, arbiter PUFs, other delay based PUFs, or any PUF implementation comparing output values from identically designed circuits. In some embodiments, the PUF core is instructed, for example by the control circuitry 123, to generate a PUF (e.g. 107 or 115) and produces a PUF that is not based on any input to the PUF core.

In some embodiments, the PUF is a series of bits suitable for obfuscating the secret 101. In some embodiments, each PUF includes a number of bits (e.g. 32, 64, 128, or 256 bits) of entropy generated by racing pairs of PUF cells, where the result of each race corresponds to a respective bit position in the PUF. In some embodiments, each bit in the PUF represents a full bit of entropy. In some embodiments, ECC data for decoding future PUF outcome is generated during the commitment phase and act 607. Systems and methods for generating PUFs, e.g. using an optimal racing strategy of PUF cells, are described throughout the disclosure.

At act 609, the encryption device performs an operation (e.g., using operator 109) to obfuscate the secret K and appended ECC data using PUF data to produce an output word W (e.g., helper data 111). The operation may be any suitable operation for using the PUF to obfuscate the secret K such that helper data W cannot be used to determine the secret K without the correct PUF. The operation may be any invertible operation or series of operations to allow for recovery of the secret K from helper data W. In some embodiments, the operation is a bitwise XOR operation, which may be its own inverse. In some embodiments, the operation masks the secret K by changing the output bits that correspond to bits in the secret K based on the PUF.

FIG. 7 shows an illustrative process flow 700 for a recovery phase for decoding a secret using a PUF, in accordance with some embodiments. The process illustrated in FIG. 7 may be executed by a cryptography device (e.g., 100) that is configured to generate a PUF output (e.g., 107 and 115). In some embodiments, the process 700 regenerates an encoded secret using helper data generated during the commitment phase.

The example process flow 700 begins at step 701, where the encryption device obtains an input word (e.g. 113). The input word may be any series of bits suitable for input to the encryption device. The input word may be used to decrypt the secret if the input helper data matches the output helper data from the encryption process.

At act 703, the encryption device generates a PUF output (e.g., 115) using a PUF core (e.g., PUF core 105). The PUF output may generated as was discussed with reference to FIGS. 3, 4A-C, and 5A-B. In some embodiments, the output of the PUF core is generated in rounds with the pairings assigned after the first round being dependent on the results of the previous rounds. In some embodiments, the generation of a PUF output is controlled by control circuitry (e.g. 123) or a processor or control circuitry in the PUF core.

At act 705, the encryption device performs the inverse (e.g., using operator 117) of an operation used (e.g., using operator 109) to obfuscate the secret K and appended ECC data during the commitment phase to estimate the secret. The operation may be any suitable operation or series of operations for inverting the operation(s) used to obfuscate the secret during encryption and estimate the secret from the input helper data. In some embodiments, the operation may be an XOR or masking operation.

At act 707, the encryption device uses the ECC to decode (e.g., using ECC decoder 119) to decode the estimate of the secret to produce a recovered secret K. The original encrypted secret may be recovered from the input helper data 113 and will match the secret if the encryption output helper data matches the decryption input helper data. In some embodiments, the encryption output helper data is stored in memory or transmitted to a user. In some embodiments, the output of the PUF core is not stored or transmitted outside the encryption device.

Figure 8:
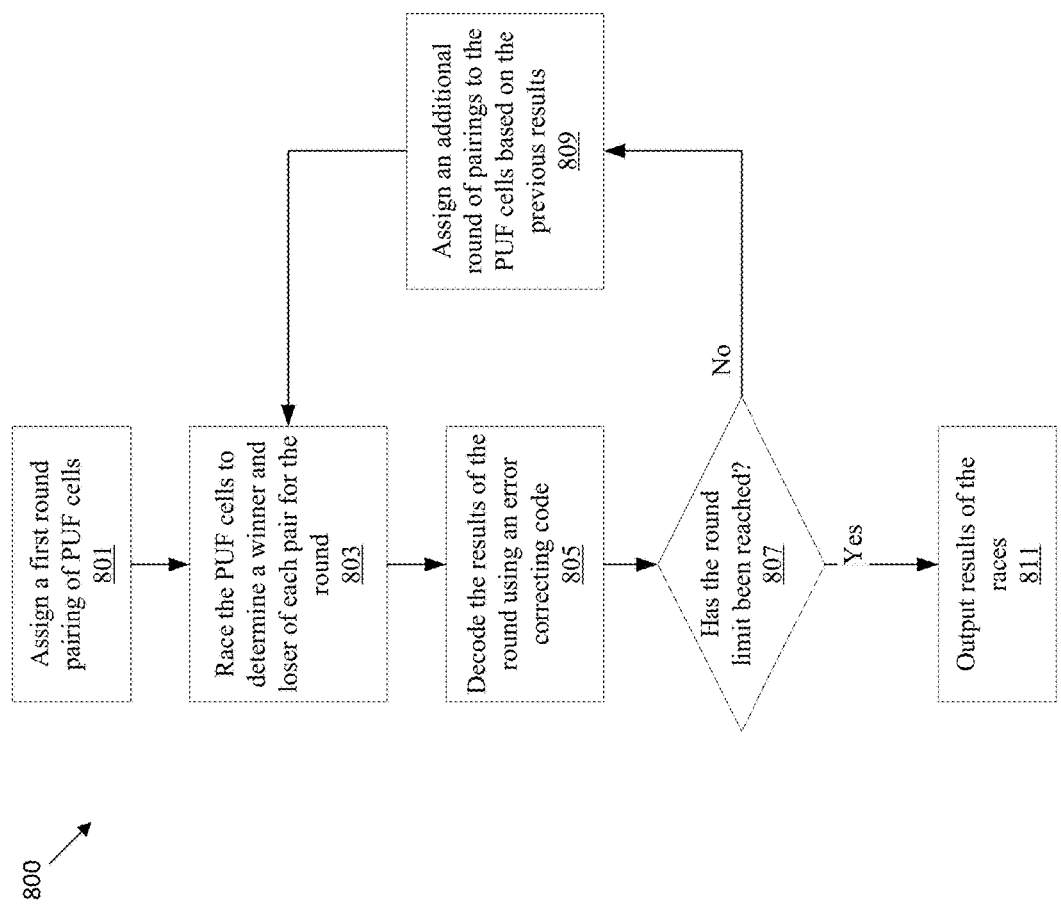
FIG. 8 shows an illustrative process flow for racing rounds of PUF cells to generate a PUF output, in accordance with some embodiments.

FIG. 8 shows an illustrative process flow for racing rounds of PUF cells to generate a PUF output, in accordance with some embodiments. The process illustrated in FIG. 8 may be executed by a cryptography device (e.g., 100) that is configured to generate a PUF output (e.g., 107 and 115) or any of the systems and methods discussed herein, for example those discussed with reference to FIGS. 1, 3, 4A-C, and 5A.

The process 800 begins at act 801, where the encryption device assigns a first round pairing of PUF cells. In some embodiments, the first pairing may be any suitable mapping of pairs that can be reproduced for reproducing the PUF output. For example, the first round of pairings may pair adjacent PUF cells. In some embodiments, the PUF cells are ordered and/or numbered 1 through N. In the first round, odd numbered PUF cells may be paired with an adjacent even numbered PUF cell, e.g. pairing PUF cells 1 and 2, PUF cells 3 and 4, PUF cells 5 and 6, . . . , and PUF cells N−1 and N. In some embodiment, the PUF cells are paired with an available PUF cell separated by N/2 spaces or another suitable distance. In some embodiments, the first round of PUF cell pairings represent an arbitrary pairwise mapping of PUF cells.

At act 803, the PUF cells paired in act 801 are raced to determine a winner and loser of each pair for the round. In some embodiments, each pair of PUF cells in the first pairing are raced by causing and/or enabling each PUF cell in the pair to generate an output. In some embodiments, based on a binary comparison of the outputs, one PUF cell of each pair is determined to be the winner and one PUF cell of each pair is determined to be the loser. For example, when the PUF cells include ring oscillators, output transitions of each oscillator may be counted for a period of time and compared, with the higher frequency oscillator producing a greater number of counts and being determined to be the winner. In some embodiments, an arbitrator based PUF may associate an arbitrator output with each of two delay paths. It should be appreciated that other delay based PUFs may be used as suitable PUF cells.

At act 805, the results of the round of races conducted in act 803 are decoded using an error correcting code. The results may decoded, for example, as was discussed with reference to FIG. 5A. The results of the races are decoded using any suitable error correcting code (e.g., ECC decoder 119). In some embodiments, the outputs of any PUF cell may be noisy. In some embodiments, the error correction may be performed using an ECC decoder (e.g. 119) that is shared with different portions of a cryptography device (e.g. 100). In some embodiments, ECC data is created for each round of race results during the encryption/commitment phase. In some embodiments, the ECC data used to decode a round of race results may be created based on a portion of a secret (e.g., a number of bits equal to the number of races in a round) being encoded. In further embodiments, the results of the round may be decoded using a portion (e.g. a number of bits equal to the number of races in a round) of a recovered secret generated from the results of the round of races and helper data used to encode a secret.

At act 807, the encryption device checks whether a limit on the number of rounds has been reached. From the foregoing discussion it should be appreciated that, in order to guarantee that each race produces a full bit of entropy, the number of rounds of pairings may be limited to the binary logarithm of the number of PUF cells, N. After this point, the race ordering of PUF cells may be largely determined and future races may yield less than full entropy. After N−1 rounds, each possible pairing of PUF cells may have been raced.

If the round limit has not been reached, the process iterates by assigning an additional round of pairings to the PUF cells based on the results of the previous rounds at act 809.

As discussed above, when PUF cells that have not been previously paired with each other or a common opponent are raced, a full bit of entropy may be generated by the outcome of the race since there is not a priori information that can be used to predict the outcome of the race. In some embodiments racing winners (losers) against winners (losers) of previous rounds pairs PUF cells with similar records and/or identical records of wins and losses and may generate a full bit of entropy. In some embodiments, N PUF cells are raced in N/2 pairs per round. Therefore, in each round that N/2

PUF cells are paired without common opponents, N/2 bits of entropy may be generated. In two rounds, N PUF cells may generate N bits of entropy.

In some embodiments, the pairings of PUF cells are selected by the PUF core 105 and/or control circuitry 123 to ensure that paired PUF cells have no common past opponent. In some embodiments, the selection is performed actively, for example by tracking the set of opponents faced by each PUF cell and selecting pairs whose sets of opponents have a null intersection. In some embodiments, the race ordering groups the PUF cells to prevent common past opponents.

In some embodiments, the race ordering is used to create conditions for full entropy to be generated by each pairing and/or race. In the first round, PUF cells cannot possibly have common opponents since no races have been performed. In some embodiments, each winner in the first round is paired with another winner from the first round and each loser is paired with another loser. In a second round assigned in this fashion, no PUF cell pair can have an intersecting history of opponents, since each winner (loser) previously raced exactly one respective loser (winner). In some embodiments, a third round of pairings is assigned such that winners (losers) of the previous round are paired with winners (losers) of the previous rounds. In some embodiments, PUF cells are paired that have the same record and that won and/or lost races in the same order.

Once the round limit has been reached, at act 811 the results of the races are output. In some embodiments, the binary result of each PUF cell race occupies a respective position in the output. For example, a first round of races may provide a first 64 bits of output and a second round of races may provide a second 64 bits of output. In some embodiments, the output of each race is mapped to a position in the PUF output according to any suitable, deterministic mapping.

Figure 9:
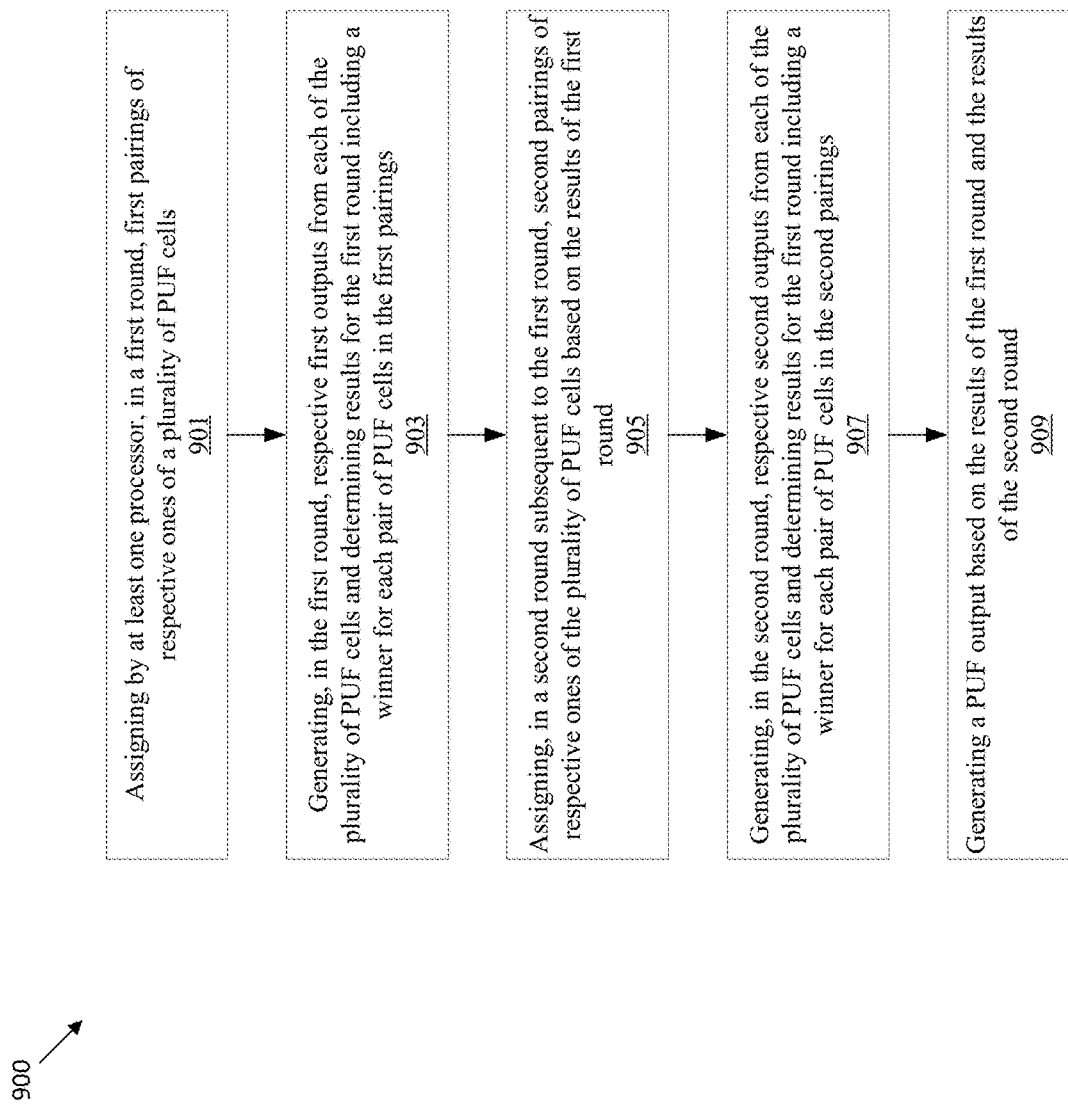
FIG. 9 shows an illustrative process flow for a method for generating entropy in a PUF encoding, in accordance with some embodiments.

FIG. 9 shows an illustrative process flow for a method for generating entropy in a PUF encoding, in accordance with some embodiments. The process illustrated in FIG. 9 may be executed by any suitable processor or control circuitry (e.g., 105 or 123) configured to generate a PUF output (e.g., 107 and 115) of any of the systems and methods discussed herein, for example those discussed with reference to FIGS. 1, 3, 4A-C, 5A-B, and 8.

Process 900 begins at act 901, when at least one processor assigns, in a first round, first pairings of respective ones of a plurality of PUF cells. In some embodiments, each PUF cell includes a respective ring oscillator circuit. In some embodiments, each PUF cell includes a respective identically designed circuit, with differences between the respective identically designed circuits stemming from manufacturing process variations. The pairings may be assigned, for example, as was discussed with reference to any of FIGS. 1, 4A, and 8.

At act 903, in the first round, respective first outputs from each of the plurality of PUF cells are generated. The first outputs are used to determine the results for the first round, including a winner for each pair of PUF cells in the first pairing. In some embodiments, processing circuitry may enable and select PUF cells used in racing, for example, as was discussed with reference to FIG. 3. In some embodiments, counters and a comparator are used to determine a winning and losing ring oscillator. In some embodiments, an arbiter determines a winning and losing delay path. In some embodiments, the winner of each pair of PUF cells is associated with an output of a binary comparison of respective outputs of each PUF cell in the pair.

In some embodiments, processing circuitry applies an error correcting code to the respective first outputs from each of the plurality of PUF cells prior to the second round and act 905. The race results may be decoded, for example, as was discussed with reference to FIG. 5A. In some embodiments, ECC helper data is calculated for the race results during a commitment phase in which a secret is encrypted.

At act 905, in a second round subsequent to the first round, second pairings of respective ones of the plurality of PUF cells are assigned based on the results of the first round. In some embodiments, the second round of pairings are assigned as was discussed with reference to FIGS. 1, 3, 5B, and 8. In some embodiments, pairings are assigned such that the respective winners of each pair of PUF cells in the first pairing is paired with another winner and losing PUF cells are paired with losing PUF cells. In some embodiments, a first winner of a first pair in a previous round is paired with a second winner of a second pair in the previous round. In some embodiments, the PUF cells in first pair in the first round are paired with the PUF cells in a second pair in the first round. In some embodiments, PUF cells are paired that won or lost races in the same order. In some embodiments, PUF cells are grouped such that PUF cells that have raced are in the same group, and pairs may be assigned by pairing each PUF cell in a first group with a respective PUF cell in a second group.

At act 907, in the second round, respective second outputs from each of the plurality of PUF cells are generated and results for the second round, including a winner for each pair of PUF cells in the second pairing, are determined. In some embodiments, a bit representing the winner of each race in each round is generated. In some embodiments, the pairings of the first round and the second round generate a number of full bits of entropy equal to the number of PUF cells.

At act 909, a PUF output based on the results of the first round and the results of the second round is generated. The PUF output may include any suitable number of bits (e.g., 32, 64, 128, or 256 bits). The PUF output may be used to obfuscate a secret—(e.g., obscure, encode, and/or encrypt portions of the secret such that the result of the obfuscation can be made public without revealing the secret). The PUF output may also be used to regenerate a secret based on helper data created during the obfuscation of the secret.

In further embodiments, the process may continue for three or more rounds. In some embodiments, one or more processors or control circuitry assigns, in a third round subsequent to the second round, third pairings of respective ones of the plurality of PUF cells based on the results of the first round and the second round, wherein each PUF cell of the plurality of PUF cells is paired with a PUF cell of the plurality of PUF cells having been the winner of an equal number of rounds (or pairings). In the third round, respective third outputs from each of the plurality of PUF cells may be generated to determine a winner for each pair of PUF cells in the third pairings. In some embodiments, additional rounds of pairings (e.g., a fourth round for a 64 PUF cell implementation or a fifth round) may be assigned based on the results of previous rounds. In some embodiments, the total number of rounds is limited by at least one processor to not exceed the binary logarithm of the number of PUF cells in the plurality of PUF cells. In further embodiments, the PUF output may include a number of full bits of entropy that exceeds the number of PUF cells.

In some examples, the components disclosed herein may read parameters or instructions that affect the functions performed by the components. These parameters or instructions may be physically stored in any form of suitable memory including volatile memory (such as RAM) or nonvolatile memory (such as a magnetic hard drive). In addition, the parameters or instructions may be logically stored in a propriety data structure (such as a database or file defined by a user space application) or in a commonly shared data structure (such as an application registry that is defined by an operating system). In addition, some examples provide for both system and user interfaces that allow external entities to modify the parameters and instructions and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiple of each selection.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for generating entropy in a physical unclonable function (PUF) encoding, the method comprising:
    assigning by at least one processor, in a first round, first pairings of respective ones of a plurality of PUF cells;
    generating, in the first round, respective first outputs from each of the plurality of PUF cells and determining results for the first round including a winner for each pair of PUF cells in the first pairings, wherein the winner for each pair of PUF cells in the first pairings is identified based on which respective PUF of each pair of PUF cells in the first pairings generates a first output prior to another PUF of each pair of PUF cells in the first pairings;
    assigning, in a second round subsequent to the first round, second pairings of respective ones of the plurality of PUF cells based on the results of the first round;
    generating, in the second round, respective second outputs from each of the plurality of PUF cells and determining results for the second round including a winner for each pair of PUF cells in the second pairings, wherein the winner for each pair of PUF cells in the second pairings is identified based on which respective PUF of each pair of PUF cells in the second pairings generates a second output prior to another PUF of each pair of PUF cells in the second pairings; and
    generating a PUF output based on the results of the first round and the results of the second round.

2. The method of claim 1, further comprising obfuscating a secret using the PUF output.

3. The method of claim 1, wherein each PUF cell, of the plurality of PUF cells, comprises one of a plurality of identically designed circuits with differences stemming from manufacturing process variations.

4. The method of claim 1, wherein assigning, in a second round subsequent to the first round, second pairings of respective ones of the plurality of PUF cells based on the results of the first round comprises:
    assigning pairings of the respective winners of each pair of PUF cells in the first pairing; and
    assigning pairings of the remaining PUF cells that were not winners in the first pairing.

5. The method of claim 1, further comprising:
    assigning, in a third round subsequent to the second round, third pairings of respective ones of the plurality of PUF cells based on the results of the first round and the second round, wherein each PUF cell of the plurality of PUF cells is paired with a PUF cell of the plurality of PUF cells having been the winner of an equal number of rounds; and
    generating, in the third round, respective third outputs from each of the plurality of PUF cells and determining a winner for each pair of PUF cells in the third pairings.

6. The method of claim 1, wherein a first winner of a first pair in a previous round is paired with a second winner of a second pair in the previous round.

7. The method of claim 1, further comprising assigning additional rounds of PUF cell pairings based on the results of previous rounds by:
    grouping, into a plurality of groups, PUF cells that have been paired in a previous round; and
    pairing each PUF cell in a first group with a respective PUF cell in a second group.

8. The method of claim 1, further comprising generating a bit representing the winner of each pair of PUF cells in each round, wherein a winner of a pair of PUF cells is associated with an output of a binary comparison of respective outputs of each PUF cell in the pair, and further wherein the pairings of the first round and the second round generate a number of bits of entropy equal to the number of PUF cells.

9. The method of claim 1, further comprising assigning additional rounds of pairings based on the results of previous rounds, wherein the total number of rounds is limited by the at least one processor to not exceed the binary logarithm of the number of PUF cells in the plurality of PUF cells.

10. The method of claim 1, wherein the method further comprises,
applying, by the at least one processor, an error correcting code to the respective first outputs from each of the plurality of PUF cells prior to the second round.

11. A system for generating entropy in a physical unclonable function (PUF) encoding, the system comprising:
a plurality of PUF cells; and
at least one processor configured to:
assign, in a first round, first pairings of respective ones of a plurality of PUF cells;
generate, in the first round, respective first outputs from each of the plurality of PUF cells and determine results for the first round including a winner for each pair of PUF cells in the first pairings, wherein the winner for each pair of PUF cells in the first pairings is identified based on which respective PUF of each pair of PUF cells in the first pairings generates a first output prior to another PUF of each pair of PUF cells in the first pairings;
assign, in a second round subsequent to the first round, second pairings of respective ones of the plurality of PUF cells based on the results of the first round;
generate, in the second round, respective second outputs from each of the plurality of PUF cells and determine results for the second round including a winner for each pair of PUF cells in the second pairings, wherein the winner for each pair of PUF cells in the second pairings is identified based on which respective PUF of each pair of PUF cells in the second pairings generates a second output prior to another PUF of each pair of PUF cells in the second pairings; and
generate a PUF output based on the results of the first round and the results of the second round.

12. The system of claim 11, wherein the at least one processor is further configured to obfuscate a secret using the PUF output.

13. The system of claim 11, wherein each PUF cell, of the plurality of PUF cells, comprises one of a plurality of identically designed circuits with differences stemming from manufacturing process variations.

14. The system of claim 11, wherein assigning, in a second round subsequent to the first round, second pairings of respective ones of the plurality of PUF cells based on the results of the first round comprises:
assigning pairings of the respective winners of each pair of PUF cells in the first pairing; and
assigning pairings of the remaining PUF cells that were not winners in the first pairing.

15. The system of claim 11, wherein the at least one processor is further configured to:
assign, in a third round subsequent to the second round, third pairings of respective ones of the plurality of PUF cells based on the results of the first round and the second round, wherein each PUF cell of the plurality of PUF cells is paired with a PUF cell of the plurality of PUF cells having been the winner of an equal number of rounds; and
generate, in the third round, respective third outputs from each of the plurality of PUF cells and determine a winner for each pair of PUF cells in the third pairings.

16. The system of claim 11, wherein a first winner of a first pair in a previous round is paired with a second winner of a second pair in the previous round, and further wherein the at least one processor is further configured to apply an error correcting code to respective outputs from each of the plurality of PUF cells prior to a current round.

17. The system of claim 11, wherein the at least one processor is further configured to assign additional rounds of PUF cell pairings based on the results of previous rounds by:
grouping, into a plurality of groups, PUF cells that have been paired in a previous round; and
pairing each PUF cell in a first group with a respective PUF cell in a second group.

18. The system of claim 11, further comprising a binary comparator, wherein the at least one processor is further configured to generate a bit representing the winner of each pair of PUF cells in each round, wherein a winner of a pair of PUF cells is associated with an output of the binary comparator having compared respective outputs of each PUF cell in the pair, and further wherein the pairings of the first round and the second round generate a number of bits of entropy equal to the number of PUF cells.

19. The system of claim 11, wherein the at least one processor is further configured to assign additional rounds of pairings based on the results of previous rounds, wherein the total number of rounds is limited by the at least one processor to not exceed the binary logarithm of the number of PUF cells in the plurality of PUF cells.

20. At least one non-transitory computer readable medium storing processor-executable instructions that, when executed, cause at least one processor to perform a method comprising:
assigning, in a first round, first pairings of respective ones of a plurality of PUF cells;
generating, in the first round, respective first outputs from each of the plurality of PUF cells and determining results for the first round including a winner for each pair of PUF cells in the first pairings, wherein the winner for each pair of PUF cells in the first pairings is identified based on which respective PUF of each pair of PUF cells in the first pairings generates a first output prior to another PUF of each pair of PUF cells in the first pairings;
assigning, in a second round subsequent to the first round, second pairings of respective ones of the plurality of PUF cells based on the results of the first round;
generating, in the second round, respective second outputs from each of the plurality of PUF cells and determining results for the second round including a winner for each pair of PUF cells in the second pairings, wherein the winner for each pair of PUF cells in the second pairings is identified based on which respective PUF of each pair of PUF cells in the second pairings generates a second output prior to another PUF of each pair of PUF cells in the second pairings; and
generating a PUF output based on the results of the first round and the results of the second round.

* * * * *